United States Patent
Ruan et al.

(10) Patent No.: US 11,713,415 B2
(45) Date of Patent: Aug. 1, 2023

(54) SALT-TOLERANT SELF-SUSPENDING PROPPANTS MADE WITHOUT EXTRUSION

(71) Applicant: Covia Solutions Inc., Independence, OH (US)

(72) Inventors: Gedeng Ruan, Houston, TX (US); Huaxiang Yang, Sugar Land, TX (US); Kanth Josyula, Sugar Land, TX (US); An Thien Nguyen, Sugar Land, TX (US)

(73) Assignee: Covia Solutions Inc., Independence, OH (US)

( * ) Notice: Subject to any disclaimer, the term of this patent is extended or adjusted under 35 U.S.C. 154(b) by 0 days.

(21) Appl. No.: 17/295,281

(22) PCT Filed: Nov. 19, 2019

(86) PCT No.: PCT/US2019/062091
§ 371 (c)(1),
(2) Date: May 19, 2021

(87) PCT Pub. No.: WO2020/106655
PCT Pub. Date: May 28, 2020

(65) Prior Publication Data
US 2022/0010199 A1 Jan. 13, 2022

Related U.S. Application Data

(60) Provisional application No. 62/854,620, filed on May 30, 2019, provisional application No. 62/770,611, filed on Nov. 21, 2018.

(51) Int. Cl.
C09K 8/80 (2006.01)

(52) U.S. Cl.
CPC ............................. C09K 8/805 (2013.01)

(58) Field of Classification Search
CPC ........ C09K 8/805; E21B 43/26; E21B 43/267
See application file for complete search history.

(56) References Cited

U.S. PATENT DOCUMENTS

| | | | |
|---|---|---|---|
| 2,703,316 A | 3/1955 | Schneider | |
| 3,596,141 A | 7/1971 | Walker | |
| 3,912,692 A | 10/1975 | Casey et al. | |
| 3,956,141 A | 5/1976 | Walker | |
| 4,022,736 A | 5/1977 | Schmitt et al. | |
| 4,387,769 A | 6/1983 | Erbstoesser et al. | |
| 4,417,989 A | 11/1983 | Hunter | |
| 4,532,052 A | 7/1985 | Weaver et al. | |
| 4,554,021 A | 11/1985 | Harvey et al. | |
| 4,632,984 A * | 12/1986 | Matsunaga | C08B 31/125 536/50 |
| 4,888,240 A | 12/1989 | Graham et al. | |
| 5,124,376 A | 6/1992 | Clark, Jr. | |
| 5,161,615 A | 11/1992 | Hutchins et al. | |
| 5,216,050 A | 6/1993 | Sinclair | |
| 5,279,656 A | 1/1994 | Sinclair | |
| 5,728,742 A | 3/1998 | Staples et al. | |
| 5,837,656 A | 11/1998 | Sinclair et al. | |
| 5,924,888 A | 7/1999 | Nguyen et al. | |
| 5,925,714 A | 7/1999 | Larson et al. | |
| 6,109,350 A | 8/2000 | Nguyen et al. | |
| 6,169,058 B1 | 1/2001 | Le et al. | |
| 6,279,656 B1 | 8/2001 | Sinclair | |
| 6,323,307 B1 | 11/2001 | Bigg et al. | |
| 6,364,018 B1 | 4/2002 | Brannon et al. | |
| 6,605,674 B1 | 8/2003 | Whipple et al. | |
| 6,667,374 B2 | 12/2003 | Hernandez-Barajas et al. | |
| 6,734,147 B2 | 5/2004 | Levy | |
| 6,742,590 B1 | 6/2004 | Nguyen | |
| 6,866,099 B2 | 3/2005 | Nguyen | |
| 6,892,813 B2 | 5/2005 | Nguyen et al. | |
| 7,021,379 B2 | 4/2006 | Nguyen | |
| 7,032,667 B2 | 4/2006 | Nguyen et al. | |
| 7,044,220 B2 | 5/2006 | Nguyen et al. | |
| 7,131,491 B2 | 11/2006 | Blauch et al. | |
| 7,132,389 B2 | 11/2006 | Lee | |
| 7,135,231 B1 | 11/2006 | Sinclair et al. | |
| 7,178,596 B2 | 2/2007 | Blauch et al. | |
| 7,204,312 B2 | 4/2007 | Roddy et al. | |
| 7,216,711 B2 | 5/2007 | Nguyen et al. | |
| 7,228,904 B2 | 6/2007 | Todd et al. | |
| 7,244,492 B2 | 7/2007 | Sinclair et al. | |
| 7,261,156 B2 | 8/2007 | Nguyen et al. | |
| 7,264,051 B2 | 9/2007 | Nguyen et al. | |
| 7,299,869 B2 | 11/2007 | Kalman | |

(Continued)

FOREIGN PATENT DOCUMENTS

| | | |
|---|---|---|
| CA | 2763357 | 12/2010 |
| CN | 1894284 A | 1/2007 |

(Continued)

OTHER PUBLICATIONS

International Search Report and Written Opinion from PCT/US2019/062090 dated Feb. 12, 2020 (14 pages).
International Search Report and Written Opinion from PCT/US2019/062091 dated Feb. 12, 2020 (16 pages).
Akdogan, Hulya, "High Moisture food extrusion," International Journal of Food Science and Technology, 1999, 34, pp. 195-207.
Goldstein et al., "Self-suspending proppant transport technology increases stimulated reservoir volume and reduces proppant pack and formation damage," Journal of Petroleum Scient and Engineering, Sep. 1, 2015, pp. 1016.
Mahoney et al., "Self-Suspending proppants from Hydraulic Fracturing," 2013, pp. 1-12.
Truong et al., Effect of the Carboxylate Group Distribution on the Potentiometric Titration of Aerylamide-Acrylie Acid Copolymers, Polymer Bulletin 24, 101-106, Springer-Verlag 1990.
Moad, Chemical Modification of Starch by Reactive Extrusion, Progress in Polymer Science 36 (2011) 218-237.

(Continued)

*Primary Examiner* — Aiqun Li
(74) *Attorney, Agent, or Firm* — Calfee, Halter & Griswold LLP

(57) ABSTRACT

A self-suspending proppant that resists the adverse effects of calcium and other cations on swelling comprises a proppant substrate particle and a gelatinized non-extruder-derived neutral starch coating on the proppant substrate particle.

11 Claims, No Drawings

(56) References Cited

U.S. PATENT DOCUMENTS

| | | |
|---|---|---|
| 7,308,939 B2 | 12/2007 | Welton et al. |
| 7,442,741 B2 | 10/2008 | Boyer et al. |
| 7,461,697 B2 | 12/2008 | Todd et al. |
| 7,482,309 B2 | 1/2009 | Ravi et al. |
| 7,490,667 B2 | 2/2009 | Sinclair et al. |
| 7,571,767 B2 | 8/2009 | Parker et al. |
| 7,666,469 B2 | 2/2010 | Weintritt et al. |
| 7,718,583 B2 | 5/2010 | Barmatov et al. |
| 7,721,804 B2 | 5/2010 | Duenckel |
| 7,726,070 B2 | 5/2010 | Thrash |
| 7,730,948 B2 | 6/2010 | de Grood et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,902,128 B2 | 3/2011 | Zhang et al. |
| 7,909,147 B1 | 3/2011 | Schnell |
| 7,931,084 B2 | 4/2011 | Nguyen et al. |
| 7,931,087 B2 | 4/2011 | Gupta |
| 7,931,089 B2 | 4/2011 | Millet et al. |
| 7,934,554 B2 | 5/2011 | Roddy |
| 7,968,501 B2 | 6/2011 | Parris |
| 7,972,997 B2 | 7/2011 | Svoboda et al. |
| 8,058,213 B2 | 11/2011 | Rediger et al. |
| 8,062,998 B2 | 11/2011 | Fulton et al. |
| 8,066,068 B2 | 11/2011 | Lesko et al. |
| 8,105,986 B2 | 1/2012 | Zhang |
| 8,127,849 B2 | 3/2012 | Gupta |
| 8,236,738 B2 | 8/2012 | Zhang |
| 8,240,383 B2 | 8/2012 | Xu et al. |
| 8,470,746 B2 | 6/2013 | Eoff |
| 8,605,674 B2 | 12/2013 | Park et al. |
| 8,661,729 B2 | 3/2014 | Hendrickson et al. |
| 9,297,244 B2 | 3/2016 | Mahoney et al. |
| 9,315,721 B2 | 4/2016 | Mahoney et al. |
| 9,644,139 B2 | 5/2017 | Mahoney et al. |
| 9,796,916 B2 | 10/2017 | Mahoney et al. |
| 9,845,427 B2 | 12/2017 | Soane et al. |
| 9,845,428 B2 | 12/2017 | Soane et al. |
| 9,845,429 B2 | 12/2017 | Soane et al. |
| 9,856,415 B1 | 1/2018 | Leverson et al. |
| 9,868,896 B2 | 1/2018 | Mahoney et al. |
| 9,932,521 B2 | 4/2018 | Soane et al. |
| 2003/0032562 A1 | 2/2003 | Crossman et al. |
| 2003/0106713 A1 | 6/2003 | Slater et al. |
| 2003/0131998 A1 | 7/2003 | Nguyen et al. |
| 2004/0081015 A1 | 4/2004 | Graham |
| 2004/0188089 A1 | 9/2004 | Nguyen |
| 2004/0244978 A1 | 12/2004 | Shaarpour |
| 2005/0006095 A1 | 1/2005 | Justus et al. |
| 2005/0019574 A1 | 1/2005 | McCrary |
| 2005/0115710 A1 | 6/2005 | Kotler et al. |
| 2005/0123590 A1 | 6/2005 | Burton |
| 2005/0167105 A1 | 8/2005 | Roddy et al. |
| 2005/0194141 A1 | 9/2005 | Sinclair et al. |
| 2005/0244641 A1 | 11/2005 | Vincent |
| 2005/0274510 A1 | 12/2005 | Nguyen et al. |
| 2006/0175059 A1 | 8/2006 | Sinclair et al. |
| 2006/0185847 A1 | 8/2006 | Saini et al. |
| 2006/0211776 A1 | 9/2006 | Crews |
| 2007/0202318 A1 | 8/2007 | Smith et al. |
| 2007/0227732 A1 | 10/2007 | Miller et al. |
| 2007/0246214 A1 | 10/2007 | Fish et al. |
| 2008/0011477 A1 | 1/2008 | Rediger et al. |
| 2008/0078547 A1 | 4/2008 | Sinclair |
| 2008/0108524 A1 | 5/2008 | Willberg et al. |
| 2008/0135242 A1 | 6/2008 | Lesko et al. |
| 2008/0176009 A1 | 7/2008 | Chereau et al. |
| 2008/0257553 A1 | 10/2008 | Gatlin et al. |
| 2008/0257833 A1 | 10/2008 | Fite et al. |
| 2008/0289828 A1 | 11/2008 | Hutchins et al. |
| 2009/0038797 A1 | 2/2009 | Skala et al. |
| 2009/0038799 A1 | 2/2009 | Garcia-Lopez de Victoria et al. |
| 2009/0062154 A1 | 3/2009 | Windebank |
| 2009/0071653 A1 | 3/2009 | Hodge |
| 2009/0099047 A1 | 4/2009 | Cunningham et al. |
| 2010/0089581 A1 | 4/2010 | Nguyen et al. |
| 2010/0126726 A1 | 5/2010 | Armstrong |
| 2010/0147515 A1 | 6/2010 | Hughes et al. |
| 2010/0167965 A1 | 7/2010 | Sebastian et al. |
| 2010/0204071 A1 | 8/2010 | Zhang |
| 2010/0249273 A1 | 9/2010 | Scales et al. |
| 2010/0252262 A1 | 10/2010 | Ekstrand et al. |
| 2010/0252263 A1 | 10/2010 | Ferrero et al. |
| 2010/0256024 A1 | 10/2010 | Zhang |
| 2010/0270023 A1 | 10/2010 | Dusterhoft et al. |
| 2010/0307749 A1 | 12/2010 | Nguyen et al. |
| 2011/0098377 A1 | 4/2011 | Huang et al. |
| 2011/0120719 A1 | 5/2011 | Soane et al. |
| 2011/0272325 A1 | 11/2011 | Soane et al. |
| 2011/0289841 A1 | 12/2011 | Thrash |
| 2012/0018162 A1 | 1/2012 | Tanguey et al. |
| 2012/0058355 A1 | 3/2012 | Lee et al. |
| 2012/0067576 A1 | 3/2012 | Reyes |
| 2012/0071371 A1 | 3/2012 | Zhang |
| 2012/0080192 A1 | 4/2012 | Hendrickson et al. |
| 2012/0190593 A1 | 7/2012 | Soane |
| 2012/0225800 A1 | 9/2012 | Hendrickson |
| 2012/0267105 A1 | 10/2012 | Zhang |
| 2012/0267112 A1 | 10/2012 | Zhang et al. |
| 2013/0186624 A1 | 7/2013 | McCrary et al. |
| 2013/0196884 A1 | 8/2013 | Kakadjian et al. |
| 2013/0233545 A1 | 9/2013 | Mahoney |
| 2014/0000891 A1 | 1/2014 | Mahoney et al. |
| 2014/0014348 A1 | 1/2014 | Mahoney et al. |
| 2014/0060832 A1 | 3/2014 | Mahoney |
| 2014/0076558 A1 | 3/2014 | Nguyen et al. |
| 2014/0087974 A1 | 3/2014 | Villarreal |
| 2014/0130892 A1 | 5/2014 | Reddy et al. |
| 2014/0135237 A1* | 5/2014 | Villarreal, Jr .......... C09K 8/516 507/119 |
| 2015/0252252 A1 | 9/2015 | Soane et al. |
| 2015/0376033 A1 | 12/2015 | Tao et al. |
| 2016/0298926 A1 | 1/2016 | Aboushabana et al. |
| 2016/0200966 A1 | 7/2016 | Mahoney et al. |
| 2016/0215208 A1 | 7/2016 | Monastiriotis et al. |
| 2017/0037303 A1 | 2/2017 | Waller et al. |
| 2017/0335178 A1 | 11/2017 | Aboushabana et al. |
| 2018/0030338 A1 | 2/2018 | Lu et al. |
| 2018/0105735 A1 | 4/2018 | Yang et al. |
| 2018/0201828 A1 | 7/2018 | Pravesh et al. |
| 2018/0155614 A1 | 9/2018 | Soane et al. |
| 2018/0371309 A1* | 12/2018 | Chan .................... C09K 8/805 |
| 2019/0002756 A1 | 1/2019 | Kincaid et al. |

FOREIGN PATENT DOCUMENTS

| | | |
|---|---|---|
| CN | 102127415 | 7/2011 |
| CN | 102167969 A | 8/2011 |
| CN | 101903453 A | 12/2012 |
| CN | 104379697 A | 2/2015 |
| CN | 106298971 A | 7/2017 |
| EP | 0101855 | 3/1984 |
| EP | 0933414 | 4/2003 |
| EP | 2066761 | 2/2009 |
| EP | 2027361 | 6/2009 |
| EP | 2175004 | 4/2010 |
| EP | 2433998 A1 | 3/2012 |
| EP | 1654439 | 6/2012 |
| JP | 05237369 | 9/1993 |
| JP | 10054990 | 2/1996 |
| JP | 2000140604 | 5/2000 |
| JP | 2001058126 | 3/2001 |
| JP | 2001342377 | 12/2001 |
| JP | 2004517712 | 6/2004 |
| JP | 2006508074 | 3/2006 |
| JP | 3832777 | 10/2006 |
| JP | 2007532721 | 11/2007 |
| JP | 2009503196 | 1/2009 |
| JP | 2009542862 | 12/2009 |
| JP | 2010502992 | 1/2010 |
| JP | 2010513212 | 4/2010 |
| RU | 2392295 | 6/2010 |
| RU | 2445339 | 3/2012 |
| RU | 2446200 | 3/2012 |

(56) References Cited

FOREIGN PATENT DOCUMENTS

| | | |
|---|---|---|
| RU | 2459852 | 8/2012 |
| WO | 199530818 | 11/1995 |
| WO | 2005121505 | 12/2005 |
| WO | 2006023172 | 3/2006 |
| WO | 2007007039 | 1/2007 |
| WO | 2007147072 | 12/2007 |
| WO | 2008028074 | 3/2008 |
| WO | 2008042317 | 4/2008 |
| WO | 2008056302 | 5/2008 |
| WO | 2008088449 A2 | 7/2008 |
| WO | 2008130279 | 10/2008 |
| WO | 2009078745 | 6/2009 |
| WO | 2009088315 | 7/2009 |
| WO | 2009091511 | 7/2009 |
| WO | 2010043852 | 4/2010 |
| WO | 2010084442 | 7/2010 |
| WO | 2010126925 | 11/2010 |
| WO | 2010129119 | 11/2010 |
| WO | 2011050046 | 4/2011 |
| WO | 2011056409 | 5/2011 |
| WO | 2011063004 | 5/2011 |
| WO | 2011081549 | 7/2011 |
| WO | 2011136678 | 11/2011 |
| WO | 2012010627 | 1/2012 |
| WO | 2012045155 | 4/2012 |
| WO | 2012151109 A1 | 11/2012 |
| WO | 2013158306 | 10/2013 |
| WO | 2013158308 A1 | 10/2013 |
| WO | 2013188413 | 12/2013 |
| WO | 2016070044 A1 | 5/2016 |
| WO | 2010070600 | 6/2016 |
| WO | 2017091463 A1 | 6/2017 |
| WO | 2019005570 A1 | 1/2019 |

OTHER PUBLICATIONS

Properties of Modified Starches and their Use in the Surface Treatment of Paper, Dissertation of Anna Jonhed, 2006:42, at http://www.diva-portal.org/smashiget/diva2:6450/FULLTEXT01.pdfAnna, Karlstad University 2006.

Kalia & Averous, Biopolymers: Biomedical and Environmental Applications, p. 89, © 2011 by Scrivener Publishing LLC, Co-published by John Wiley & Sons, Hoboken, N.J.

Maher, Alkali Gelatinization of Starches, Starch/Starke 35 (1983) Nr. 7, S. 226-234, © Verlag Chemie GmbH, D-6940 Neinheim 1983.

Harper, J.M. (1978). "Food extrusion". Critical Reviews in Food Science and Nutrition 11 (2): 155-215. doi:10.1080/10408397909527262. PMID 378548.

Riaz, Mian N. (2000). Extruders in Food Applications. CRC Press, p. 193. ISBN 9781566767798.

Norman, I.R., "Application of Curable Resin-Coated Proppants", SPE Production Engineering , Nov. 1992.

Kim A.J. et al., "Swelling-Based Method for Preparing Stable, Functionalized Polymer 2, Olloids" J. Am. Chem. Soc. 127(6): 1592-1593 (2005).

Website printout, Wikipedia's monographs on Binding Constant; http://en.wikipedia/org/wiki/Binding_constant; page last modified on Feb. 1, 2014; retrieved Apr. 23, 2015; 2 pages.

Okay, Oguz, "Swelling behavior of poly(acrylamide-co-sodium acrylate) hydrogels in aqueous salt solutions: theory versus experiments", European Polymer Journal 36 (2000) 393-399.

http://www.balcoindia.com/operation/bauxite2.aspx, downloaded on Aug. 14, 2015.

http://www.aqua-calc.com/page/density-table/substance/sand-coma-and-blank-fine, downloaded 08/1412015.

Lertsutthiwong et al., Effect of Chemical Treatment on the Characteristic of Shrimp Chitosan—Lertsutthiwong et al. Journal of Metlas, Materials and Mineral, vol. 12, No. 1, pp. 11-18 (2002).

Website printout, Wikipedia's monographs on Ligand; http://en.wikipedia/org/wiki/Ligand_(biochemistry); page last modified on Feb. 6, 2014; retrieved Apr. 23, 2015; 5 pages.

Clarke, Neil, "Binding equilibria", Topics in Biophysical Chemistry, 1998; http://biophysics.med.jhmi/edu/courses/pdf/bindeq.pdf; 18 pages.

Review of Chemical Equilibrium; University of Buffalo, Review of Chemical Equilibrium, University of Buffalo, www.3csu_buffalaedui-koudelka/Binding-constant-lectures_pdf, known prior art, 15 pages.

Thordarson, Determining Association Constants from Titration Experiments in Supramolecular Chemistry, Chem. Soc. Rev. 2011, vol. 40, pp. 1305-1323.

Marini, Ma, Evans WJ, Berger RL; Use of the twin-cell differential titration calorimeter for binding studies. I. EDTA and its calcium complex. J Biochem Biophys Methods_ Mar. 1985; 10(5-6): 273-285.

Tudorachi, Synthesis and Swelling behaviour of some crosslinked poly(vinyl alchol)-acrylamide hydrogels, materials Plastice, 45, Nr.4 2008 (Year 2008), pp. 326-331.

Hittp://www.aqua-cal.com/page/density-table/substance/bauxite-coma-and-blank-crushed, downloaded Aug. 14, 2015 (2 pages).

\* cited by examiner

SALT-TOLERANT SELF-SUSPENDING PROPPANTS MADE WITHOUT EXTRUSION

RELATED APPLICATIONS

This application is a 371 Application of PCT Application No. PCT/US2019/062091, filed on Nov. 19, 2019, which claims priority to U.S. Provisional Application Ser. No. 62/854,620, filed May 30, 2019, titled SALT-TOLERANT SELF-SUSPENDING PROPPANTS MADE WITHOUT EXTRUSION and U.S. Provisional Application Ser. No. 62/770,611, filed Nov. 21, 2018, titled SALT-TOLERANT SELF-SUSPENDING PROPPANTS MADE WITHOUT EXTRUSION, the entire disclosures of which are incorporated by reference herewith.

BACKGROUND AND SUMMARY

WO 2017/091463 describes certain salt-tolerant self-suspending proppants in which the hydrogel polymer coating of the proppant is made from a cationic starch produced by reactive extrusion (REX). "Salt-tolerant" in this context refers to the ability of these proppants to tolerate large concentrations of calcium and other divalent cations without losing their ability to swell substantially. As described there, self-suspending proppants exhibiting a high degree of salt tolerance can be provided by forming the hydrogel polymer coating of the proppant from a starch which has been rendered cationic by reactive extrusion. See, also, commonly assigned U.S. 2017/0335178. The disclosures of these documents are incorporated herein by reference in their entirety.

We have now found that self-suspending proppants in which the hydrogel polymer coating is made from a gelatinized neutral starch also exhibit excellent salt tolerance as well, even though this gelatinized neutral starch does not carry a cationic charge and even though this gelatinized neutral starch has not been made by reactive extrusion.

Thus, this invention provides a process for fracturing a geological formation comprising pumping into the formation an aqueous fracturing fluid containing a self-suspending proppant comprising a proppant substrate particle and a coating of a hydrogel polymer on the proppant substrate particle, wherein the hydrogel polymer is a gelatinized, non-extruder-derived neutral starch.

In addition, this invention also provides a self-suspending proppant exhibiting enhanced salt-tolerance, this self-suspending proppant comprising a proppant substrate particle and a coating of a hydrogel polymer on the proppant substrate particle, wherein the hydrogel polymer is a gelatinized, non-extruder-derived neutral starch.

DETAILED DESCRIPTION

Proppant Substrate Particle

As indicated above, the self-suspending proppants of this invention take the form of a proppant substrate particle carrying a coating of a neutral polymer.

For this purpose, any particulate solid which has previously been used or may be used in the future as a proppant in connection with the recovery of oil, natural gas and/or natural gas liquids from geological formations can be used as the proppant substrate particle of the self-suspending proppants of this invention. In this regard, see our earlier filed applications mentioned above which identify many different particulate materials which can be used for this purpose. These materials can have densities as low as ~1.2 g/cc and as high as ~5 g/cc and even higher, although the densities of the vast majority will range between ~1.8 g/cc and ~5 g/cc, such as for example ~2.3 to ~3.5 g/cc, ~3.6 to ~4.6 g/cc, and ~4.7 g/cc and more.

Specific examples include graded sand, resin coated sand including sands coated with curable resins as well as sands coated with precured resins, bauxite, ceramic materials, resin coated ceramic materials including ceramics coated with curable resins as well as ceramic coated with precured resins, glass materials, polymeric materials, resinous materials, rubber materials, nutshells that have been chipped, ground, pulverized or crushed to a suitable size (e.g., walnut, pecan, coconut, almond, ivory nut, brazil nut, and the like), seed shells or fruit pits that have been chipped, ground, pulverized or crushed to a suitable size (e.g., plum, olive, peach, cherry, apricot, etc.), chipped, ground, pulverized or crushed materials from other plants such as corn cobs, composites formed from a binder and a filler material such as solid glass, glass microspheres, fly ash, silica, alumina, fumed carbon, carbon black, graphite, mica, boron, zirconia, talc, kaolin, titanium dioxide, calcium silicate, and the like, as well as combinations of these different materials. Especially interesting are intermediate density ceramics (densities ~1.8-2.0 g/cc), normal frac sand (density ~2.65 g/cc), bauxite and high density ceramics (density ~3-5 g/cc), just to name a few. Resin-coated versions of these proppants, and in particular resin-coated conventional frac sand, where in resin is, for example, phenolic novolacs, phenolic urethanes, epoxy or any combination of any such resins are also good examples.

All of these particulate materials, as well as any other particulate material which is used as a proppant in the future, can be used as the proppant substrate particle in making the self-suspending proppants of this invention.

Hydrogel Coating

The self-suspending proppants of this invention are made in such a way that
(1) optionally and preferably, they are free-flowing when dry,
(2) they rapidly swell when contacted with their aqueous fracturing fluids,
(3) they form hydrogel coatings which are large enough to significantly increase their buoyancy during transport downhole, thereby making these proppants self-suspending during this period,
(4) these hydrogel coatings are durable enough to maintain the self-suspending character of these proppants until they reach their ultimate use locations downhole, and
(5) these hydrogel coatings are especially resistant to the adverse effects calcium and other cations can have on the swelling properties of these coatings.

In accordance with this invention, this is accomplished by (1) selecting a non-extruder-derived neutral starch as the hydrogel-forming polymer, (2) treating the non-extruder-derived neutral starch, the proppant substrate particles or both to enhance coating adhesion, (3) subjecting a mixture of the proppant substrate particles and the non-extruder-derived neutral starch to simple mixing while the starch is gelatinized in form thereby forming discrete starch-coated substrate particles, and then (4) drying the starch-coated substrate particles so formed.

A wide variety of different starches can be used as raw materials for making the self-suspending proppants of this invention. Examples include potato starch, wheat starch, tapioca starch, cassava starch, rice starch, corn starch, waxy corn starch, waxy wheat starch, waxy rice starch, waxy sorghum starch, waxy cassava starch, waxy barley starch, and waxy potato starch.

Starches can be either naturally-occurring or modified. In addition, modified starches can be either chemically modified, charge-modified or both. In this context, "chemically-modified" means a modification which is made to the chemistry of the starch which does not appreciably change the ability of the starch to ionize, and hence to produce net positive and/or negative charges, when the starch is dissolved or dispersed in water. Examples of chemically modified starches include alkylated starches, oxidized starches, acetylated starches, hydroxypropylated starches, monophosphorylated starches, distarch phosphate, starch acetate, octenylscuccinylated starches, bleached starches, dextrin, dextran and so forth.

Meanwhile, "charge modified" means a modification which is made to the chemistry of the starch which appreciably changes its ability to ionize, and hence to produce positive and/or negative charges, when the starch is dissolved or dispersed in water. Starches (whether naturally-occurring or chemically-modified) can be either neutral, anionic, cationic or amphoteric, depending primarily on the type and concentration of substituents present at the 2, 3, 5 and 6 positions of the monosaccharide units forming the starch molecule. Starches exhibiting net negative charges are considered to be anionic, while starches exhibiting net positive charges are considered to be cationic. Starches exhibiting both negative and positive charges are considered to be amphoteric, while starches exhibiting little or no positive or negative charges are regarded as being neutral.

"Charge-modified starches" in the context of this document refers to starches, whether naturally-occurring or chemically modified, which have been intentionally treated to introduce appreciable amounts of charge-bearing functional groups into these 2, 3, 5 and/or 6 positions, thereby appreciably changing the ability of these starches to ionize and hence produce positive and/or negative charges when dissolved or dispersed in water. See, the above-noted U.S. 2017/0335178 and WO 2017/091463, which extensively describe how to make charge-modified starches.

As described there, a common way of making charge-modified starches is reactive extrusion in which a "raw" (natural) starch, a suitable charge-modifying agent, a catalyst and water, usually under slightly alkaline conditions, are charged into a heated extruder where they are subjected to elevated temperatures and extremely high shear forces. As a result, functional groups carrying positive and/or negative charges, depending on the particular charge-modifying agents used, are introduced into one or more of the 2, 3, 5 and 6 positions of the monosaccharide units forming the starch molecule. For ease of description, charge-modified starches which are made in this way are referred to in this disclosure as "extruder-derived" starches. In contrast, starches which have not been processed by reactive extrusion are referred to in this disclosure as "non-extruder-derived" starches.

In accordance with this invention, the starches that are used to make the self-suspending proppants of this invention are non-extruder-derived neutral starches. That is to say, these starches have not been subjected to reactive extrusion anytime during their lifetime. In addition, these starches contain little or no negative or positive charge-bearing functional groups. In this context, "little or no" negative or positive charge-bearing functional groups means that the concentration of these groups, i.e., the total concentration of negative groups as well as the total concentration of positive groups, as measured by the degree of substitution ("DS") of each is less than 0.1. More typically, the degree of substitution ("DS") of each will be less than 0.09, 0.08, 0.07, less than 0.06, less than 0.05, less than 0.04, less than 0.03, less than 0.02 or even less than 0.01.

Preferred starches for use in this invention are non-charge-modified, meaning they have not been modified by intentionally introducing charge-bearing functional groups into the 2, 3, 5 and/or 6 positions of the starch molecule, whether such starches are naturally-occurring or chemically-modified.

An important feature of the technologies described in the above-noted WO 2017/091463 is that extruder-derived, charge-modified cationic starches are used to make the hydrogel coatings of the self-suspending proppants described there. This is because, as described there, only cationic starches which contain an appreciably large concentration of cationic substitution will exhibit the level of salt tolerance desired, while only reactive extrusion will produce cationic starches with these appreciably large concentrations of cationic substitution as a practical matter. So, an important feature of these earlier salt-tolerant self-suspending proppants is that the cationic starches from which they are made have been intentionally charge-modified by reactive extrusion so that they exhibit a cationic degree of substitution ("DS") of at least 0.09, more typically at least 0.1, at least 0.2 and even, in some instances, at least 0.4.

This invention departs from these earlier technologies in that the starches which are used to make the inventive salt-tolerant self-suspending proppants contain little or no cationic substitution. This is because it has been found, in accordance with this invention, that gelatinization of the starch during proppant manufacture, whether partial or total, will also achieve a significant degree of salt tolerance in the proppants obtained even if the starch used contains little or no cationic substitution. As a result, non-extruder-derived "neutral" starches can be used to make the inventive salt-tolerant self-suspending proppants, which results in a significant decrease in production costs because expensive extruder-based processing has been eliminated.

In accordance with this invention, therefore, the concentration of cationic charge-bearing moieties in the starch which is used to make the self-suspending proppants of this invention, as measured by the degree of substitution (DS) of these moieties, is less than 0.1, more typically less than 0.09, less than 0.08, less than 0.07, less than 0.06, less than 0.05, less than 0.04, less than 0.03, less than 0.02 or even less than 0.01. Similarly, the concentration of anionic charge-bearing moieties in these starches, as measured by the degree of substitution (DS) of these moieties, is also less than 0.08, more typically less than 0.07, less than 0.06, less than 0.05, less than 0.04, less than 0.03, less than 0.02 or even less than 0.01.

Preferably, the starches which are used to make the self-suspending proppants of this invention are "non-charge-modified," by which is meant that they have not been intentionally modified by introducing charge-bearing functional groups into the 2, 3, 5 and/or 6 positions of the starch molecule, whether such starches are naturally-occurring or chemically-modified.

Especially interesting of the foregoing starches are those having from about 1 to 50 wt. %, more typically about 5 to 30 wt. % or even about 10 to 25 wt. % of amylose (linear polymer) units and about 50 to 99 wt. %, more typically about 70 to 95 wt. % or even about 75 to 90 wt. % of amylopectin (branched polymer) units.

Also interesting are those starches having molecular weights of about 1 to 8 million Daltons, more typically about 2 to 6 million Daltons, although higher and lower molecular weights are still possible.

A wide variety of different commercially available neutral starches can be used for the purposes of this invention. Examples include Argo® Corn Starch, ADM® Clinton 104 Corn Starch, Clinton 106 Corn Starch, Clinton 110 Corn Starch, AYTEX® P Wheat Starch, EDIGEL 100 Wheat Starch, GEN-VIS® 700, PAYGEL® P Wheat Starch, PAYGEL® 290 Wheat Starch, Cargill Gel™ native starch, Avebe potato starch, Bene rice starch, Tate & Lyle Pearl Dent Unmodified Starch, EcoAgril Native Potato Starch, EcoAgril Native Pea Starch, EcoAgril Native Waxy Corn Starch, EcoAgril Native Wheat Starch, EcoAgril Native tapioca Starch, Superbond® T30F, Superbond® T40F, PURE-DENT® B700, Venus Maize Starch, Tereos Meritena® 100, etc.

In addition to the above neutral starches, blends of these neutral starches with other neutral hydrogel-forming polymers can also be used. For example, neutral polysaccharides other than neutral starches can be used. Examples include chitosan, cellulose, and cellulose derivatives including alkyl cellulose ethers such as methyl cellulose, ethyl cellulose and/or propyl cellulose, hydroxy cellulose ethers such as hydroxy methyl cellulose, hydroxy ethyl cellulose and/or hydroxy propyl cellulose, cellulose esters such as cellulose acetate, cellulose triacetate, cellulose propionate and/or cellulose butyrate, cellulose nitrate, cellulose sulfate and glycogen. Mixtures of these neutral polysaccharides other than neutral starches can also be used.

In addition to these neutral polysaccharides, other hydrogel polymers can also be included in the hydrogel coatings of the inventive self-suspending proppants. Examples include polyacrylamide, copolymers of acrylamide with anionic and cationic comonomers, hydrolyzed polyacrylamide, copolymers of acrylamide with hydrophobic comonomers, poly(acrylic acid), poly(acrylic acid) salts, guar gum, alginate, carrageenan, locust bean gum, carboxymethyl guar, carboxymethyl hydroxypropyl guar gum, hydrophobically associating swellable emulsion (HASE) polymers, latex and the like. Such hydrogel polymers can be anionic, cationic, amphoteric, neutral, or a mixture thereof and can be added at any time during the process of making non-extruder derived starch coated proppants. For example, these hydrogel polymers can be added along with the non-extruder derived starches of this invention just before drying or even after drying, etc.

In those instances in which other hydrogel-forming polymers other than neutral starches are used, at least 50 wt. % of the hydrogel-forming material used, as a whole in the hydrogel coating of the inventive self-suspending proppants, should be based on monosaccharide units having a neutral charge. Blends in which the amount of polymerized charge-neutral monosaccharide units is at least 60 wt. %, at least 70 wt. %, at least 80 wt. % and even at least 90 wt. % are also contemplated.

Gelatinizing the Starch

The self-suspending proppants of this invention are made by a process in which the proppant substrate particles and the non-extruder-derived neutral starch from which these proppants are made are mixed together while the starch is in a gelatinized form or condition.

Starch molecules arrange themselves in plants in semi-crystalline granules. Heating in water causes water molecules to diffuse through these granules, causing them to become progressively hydrated and swell. In addition, their amylose content depletes through leaching out by the water. When further heated, these granules "melt" or "destructure" in the sense that their semi-crystalline structure is lost, which can be detected by a variety of different means including X-ray scattering, light-scattering, optical microscopy (birefringence using crossed polarizers), thermomechanical analysis and NMR spectroscopy, for example. This "melting"-"destructuration" effect is known as gelatinization. See, Kalia & Averous, Starchs: Biomedical and Environmental Applications, p. 89, © 2011 by Scrivener Publishing LLC, Co-published by John Wiley & Sons, Hoboken, N.J. In accordance with this invention, the non-extruder-derived neutral starch is in a gelatinized condition when being formed into coatings on the proppant substrate particles. In other words, at the time when coatings of the non-extruder-derived neutral starch are being formed on the individual proppant substrate particles, which is normally done by simple mixing as further discussed below, the non-extruder-derived neutral starch is in a gelatinized condition.

In this regard, it is well known that the amount of water that can be taken up by starch when it gels can be many times its weight, e.g., as much as 80 times its weight. In addition, it is also known that gelatinization of a starch can occur even if the amount of water taken up by the starch is less than the total amount of water the starch is capable of taking up. So, when we say that the non-extruder-derived neutral starch of this invention is in a gelatinized form or condition, what we mean is that the amount of water that has been taken up by the starch is sufficient so that that its semi-ordered structure is essentially gone. And by "essentially gone," what we mean is that while some small amount of semi-ordered structure can still be detected, nonetheless the physical state of the starch as a whole has changed from its prior condition (e.g., solid particulate or liquid solution or dispersion) to a gel-like mass. Thus, when we say that the starch is in a "gelatinized" form or condition, we do not mean that the starch has taken up all the water it is capable of taking up, since in many instance of our invention, the amount of water taken up by the starch through gelatinization will be less than this total.

Accordingly, in this disclosure, we use the term "gelatinized starch" to refer both to starches which are incapable of taking up any more water of gelatinization as well as to starches which can still take up additional water of gelatinization.

Starch gelatinization normally requires that the starch-water combination have a slightly alkaline pH such as ≥7.5, ≥8, ≥9, and even ≥10. Any such pH can be used for carrying out this invention. In addition, while NaOH is most conveniently used for pH adjustment, other chemicals such as KOH and other common inorganic bases can also be used. Normally, the amount of inorganic base used will be such that the ratio of the number of moles of inorganic base used for gelatinization to the number of moles of repeating monosaccharide units forming the starch being gelatinized (hereinafter the "inorganic base/starch molar ratio") is up to 1.5 or more, but will normally be >0-1, more typically 0.1-0.8 or even 0.15-0.50. In addition, for the purpose of calculating this ratio, it assumed that the inorganic base used for gelatinization is NaOH. If a different inorganic base is used, e.g., $Mg(OH)_2$, then an equivalent amount of this different inorganic base should be used.

In lieu of pH adjustment, other means for facilitating starch gelatinization can also be used, examples of which include enzymatic action and physical means. See, Maher, Alkali Gelatinization of Starches, Starch/Starke 35 (1983) Nr. 7, S. 226-234, © Verlag Chemie GmbH, D-6940 Weinheim 1983.

In addition to sufficient water at a suitable pH, starch gelatinization also normally requires that the starch-water combination be heated to above a characteristic temperature, known as the gelatinization temperature. See, the above-noted Kalia publication. Note, also, that this temperature can be lowered by the use of additional materials such as alcohols, sugars, organic acids, etc., which can be used in this invention, if desired.

In any event, where heating is needed for starch gelatinization, it will normally be done at moderate temperatures, e.g., 40°-100° C., although gelatinization temperatures of 45°-90° C., 50°-80° C. or even 60°-75° C., are also contemplated. Normally, heating will be done by heating the non-extruder-derived neutral starch of this invention and/or the water with which it is combined, before or after they are combined. However, in some embodiments of this invention, especially when high shear mixing is used, external heating of these ingredients may be unnecessary, since the mixing process by which they are combined will inherently produce enough heat to effect gelatinization.

In addition to water, suitable pH and heating, starch gelatinization also normally requires that the starch-water combination be intimately mixed together. As indicated above, this invention departs from prior practice in that, in this invention, simple mixing is used for this purpose. In this context, "simple mixing" will be understood to mean the type of mixing that occurs when mixing is done by mixers which are not extruders, examples of which include mixers which use rotating paddles, impellers and/or similar devices for physically combining the ingredients to be mixed.

Examples of industrial mixers of this type include pug mills, Hobart commercial mixers designed for various restaurant and other food applications, commercial planetary mixer, industrial batch mixers, continuous swivel mixers, and commercial high shear mixers. Examples of laboratory-scale mixers of this type include KitchenAid brand mixers designed for both home and light industrial use, overhead stirrers such as a Heidolph RZR 2051 control overhead stirrer and high shear laboratory mixers such as a Silverson L5M-A high shear-mixer. These mixers differ from extruders in that they do not apply to the ingredients being mixed the high pressures and very high shear forces that are normally associated with extruder mixing.

As indicated above, earlier technologies for producing salt-water-tolerant self-suspending proppants required that cationic hydrogel polymers be used to form the swellable coatings of these products because of the well-known tolerance of cationic hydrogel polymers to the adverse effects of high salt content on swelling. In addition, where starches were used to make these products, these earlier technologies normally used reactive extrusion processes (REX) for introducing the desired cationic charge into these starches, because REX was believed to be the most efficient and cost-effective way to introduce the appreciably large concentrations of cationic substitution thought necessary.

In accordance with this invention, it has been found that neutral starches provide essentially the same salt-water-tolerance as cationic starches when used to make self-suspending proppants, provided that the neutral starch is gelatinized in form. As a result, it is possible in accordance with this invention to use simple mixing to make the hydrogel coating material used to make these products, which enables REX processes to be totally eliminated. This, in turn, greatly reduces production costs, since it eliminates the large capital outlays and expensive operating costs associated with REX processing.

The viscosity of the water/starch mixture of this invention once gelation is complete depends, among other things, on the amount of water that has been combined with the starch before gelatinization is complete. And for this purpose, it will be understood that all of the water combined with the starch will be taken into account including the moisture content of the neutral starch if supplied in solid form, the amount of water of gelation already taken up by the starch if the starch supplied by the manufacturer is already gelatinized, the water content of the neutral starch paste, emulsion or solution if the neutral starch is supplied in any of these forms, any make-up water that might be added, and the water content of any additives or other ingredients that might be used such as crosslinking agents, pretreating agents for the proppant substrate particles and other hydrogel polymers.

Normally, the amount of water used to make the gelatinized non-extruder-derived neutral starch of this invention will be such that the amount of starch in the starch/water mixture which is used to make this gelatinized starch will be no more than about 60 wt. %, based on the combined weights of all the water in this mixture, as described above, plus the non-extruder-derived neutral starch of this invention being taken in a completely dry (i.e., moisture-free) state. More typically, the amount of water used to make the gelatinized non-extruder-derived neutral starch of this invention will be selected so that the amount of starch in this starch/water mixture will be no more than about 55 wt. %, no more than about 50 wt. %, no more than about 45 wt. %, no more than about 40 wt. %, no more than about 35 wt. %, no more than about 30 wt. %, no more than about 25 wt. %, no more than about 20 wt. %, no more than about 15 wt. %, no more than about 10 wt. %, no more than about 5 wt. %, or even less.

The amount of water used to make the gelatinized non-extruder-derived neutral starch of this invention can also be described in terms of the starch/water ratio of the starch/water mixture which is used to make this gelatinized starch on the same basis, i.e., based on the combined weights of all the water in this mixture, as described above, plus the non-extruder-derived neutral starch of this invention being taken in a completely dry (i.e., moisture-free) state. Measured in this way, the amount of water used to make the gelatinized non-extruder-derived neutral starch of this invention will be such that the starch/water weight ratio in the starch/water mixture is no greater than 1.5, more typically no greater than 1.25, no greater than 1.0, no greater than 0.75, no greater than 0.5, no greater than 0.45, no greater than 0.4, no greater than 0.35, no greater than 0.3, no greater than 0.25, no greater than 0.2, no greater than 0.15, no greater than 0.1, and even no greater than 0.05.

There is no theoretical maximum amount of water that can be used to make the gelatinized non-extruder-derived neutral starch of this invention. However, practical considerations limit this maximum in that it becomes increasingly uneconomic to make the inventive self-suspending proppants if too much water is present.

As indicated in the following section of this disclosure, it may be desirable at least in some embodiments of this invention that the gelatinized non-extruder-derived neutral starch of this invention be in a "highly viscous" condition when coated onto the proppant substrate particles, as this can also greatly reduce production costs. In this context, "highly viscous" means that the gelatinized non-extruder-derived neutral starch (plus any other hydrogel-forming polymers that may be present, if any) should have a viscosity of at least 1,000 cPs. Viscosities of at least 2,000 cPs, at least 3,500 cPs, at least 4,000 cPs, at least 5,000 cPs, at least 7,500 cPs, and even at least 10,000 cPs are also of interest. Of course, the viscosity of the starch cannot be so great that it is unable to form coatings on the proppant substrate particles.

To achieve this highly viscous consistency, we have found it desirable to limit the amount of water used to make the gelatinized non-extruder-derived neutral starch of this invention as set forth in the following Table 1. Note that this table uses the same basis as discussed above, i.e., the weight of the starch is based on the starch being moisture-free while the weight of the water includes the weight of all water present.

TABLE 1

Amount of Starch in Starch/Water Mixture

| Type of Simple Mixing | Amount of Starch, wt. % | | |
|---|---|---|---|
| | Practical Maximum | Better | Preferred |
| High Shear | ≤60 | ≤45 | 25-35 |
| Low Shear | ≤50 | ≤40 | 20-30 |

From this Table 1, it can be seen that there is a certain relationship between the type of mixing used (i.e., the extent to which the mixture is mixed) and the amount of starch in the starch/water mixture. In particular, Table 1 shows that when more vigorous mixing is used, a greater amount of starch can be tolerated in the starch/water mixture while still obtaining a degree of gelatinization. In the same way, we have also found that higher temperatures, longer processing times, greater amounts of inorganic base and/or more water leads to speedier gelatinization and/or a greater degree of gelatinization for a given processing time.

Using the correct amount of water to make a gelatinized non-extruder-derived neutral starch of this invention with the desired highly viscous consistency depends, among other things, on the nature of the starch as received from the manufacturer. In those instances in which this starch is ungelatinized and in powder form, then the amount of water needed corresponds to the amount set forth in the above Table 1. In contrast, if this starch raw material is in powder form but already gelatinized, then less water will be needed for this purpose.

If the neutral starch raw material received from the manufacturer is in a different form such a solution or dispersion, for example, then it will likely be necessary to add additional amounts of neutral starch powder to this solution or dispersion for achieving the desired viscosity in the gelatinized starch ultimately obtained.

Finally, in those instances in which the neutral starch raw material received from the manufacturer is in the form of a paste, achieving the desired viscosity will likely involve adding additional make-up water if the paste is too thick or additional neutral starch powder if this paste is too thin.

Regardless of which of these approaches is adopted, if the amount of water used generally conforms to the requirements of Table 1, simple continuous mixing of the starch/water mixture at moderate temperatures as described above will normally be sufficient to cause gelatinized starch with the desired high viscosity to be obtained. In addition, as further described below, if proppant substrate particles are present when this simple mixing occurs, desired coatings of this gelatinized starch on these proppant substrate particles will also form.

Mixing the Starch and Proppant Substrate Particles

As indicated above, the proppant substrate particles and the non-extruder-derived neutral starch are mixed together by simple mixing while the starch is gelatinized in form. In other words, the gelatinized form of the starch should develop at least by the time coatings of the starch begins to form on the individual proppant substrate particles as a result of simple mixing. This does not mean this gelatinized form should develop, wholly or partially, before the starch is combined with proppant substrate particles, since as shown in some of the following working examples starch gelatinization may not occur until after the starch and proppant substrate particles are combined.

In order that the proppant substrate particles and the non-extruder-derived neutral starch can be mixed together "while the starch is gelatinized in form," these ingredients can be combined with one another before, during or after starch gelatinization. So, for example, if the neutral starch raw material being used is ungelatinized, the proppant substrate particles, the ungelatinized starch and any make-up water and other chemicals needed for starch gelatinization (e.g., NaOH or analog) can be combined with one another before starch gelatinization. Continued mixing and optional heating will cause the starch to gelatinize and swell, thereby thickening the mixture, followed by forming a coating of the gelatinized starch mixture on the individual proppant substrate particles.

Alternatively, the ungelatinized starch can be gelatinized before being combined with the proppant substrate particles by subjecting the non-extruder-derived neutral starch of this invention together with any make-up water and other ingredients needed for starch gelatinization (e.g., NaOH or analog) to simple mixing in the manner described above and then combining the freshly-made gelatinized neutral starch produced in this way with the proppant substrate particles, followed by mixing for coating the freshly-gelatinized starch onto the proppant substrate particles. If so, the freshly-gelatinized neutral starch can be directly combined with the proppant substrate particles as soon as it is formed, meaning that the freshly-gelatinized starch is not allowed to dry or to cool to room temperature before being combined with the proppant substrate particles, Alternatively, the freshly-gelatinized neutral starch may be stored for an extensive period of time before being combined with the proppant substrate particles such as, for example, 1-3 days, 1-2 weeks and even several months or longer.

In those embodiments of the invention in which the neutral starch obtained from the manufacturer is already gelatinized, mixing of the starch and proppant substrate particles is carried out to effect coating of this previously-gelatinized starch onto these proppant substrate particles.

As indicated above, it may be desirable in at least some embodiments of this invention that the gelatinized neutral starch adopt a highly viscous consistency when combined with and coated onto its proppant substrate particles. In other words, this highly viscous consistency should develop at least by the time coatings of the gelatinized starch begin to form on the individual proppant substrate particles. This does not mean this highly viscous nature should develop, wholly or partially, before the starch is combined with proppant substrate particles, since as shown in some of the following working examples this highly viscous nature may develop in situ only after the starch, make up water and additional chemicals needed for gelatinization have been previously combined.

In this regard, simple mixing of this highly viscous gelatinized neutral starch together with the proppant substrate particles at moderate temperatures as described above will normally be sufficient to cause the desired starch coating to form in a relatively short period of time, e.g., 30 minutes or less, as illustrated in the following working examples. And this is so, regardless of whether the desired "high viscosity" of the gelatinized neutral starch is developed before or after it is combined with the proppant substrate particles.

The relative amounts of the non-extruder-derived gelatinized neutral starch and proppant substrate particles to use in making the self-suspending proppants of this invention can vary widely and essentially any amounts can be used depending, among other things, on the degree or extent to which it is desired to increase the buoyancy of the self-suspending proppants being made. One way this enhanced buoyancy can be quantified is by comparing the thickness of the hydrogel coating that is formed after the neutral starch coating has expanded through contact with an excess of water with the average diameter of the proppant particle substrate. For example, the amount of non-extruder-derived neutral starch used can be sufficient so that the thickness of the hydrogel coating which is formed upon gelatinization is 10% to 1000% of the average diameter of the proppant particle substrate. Hydrogel coating thicknesses of 25% to 750%, 50% to 500%, 100% to 300% and 50 to 150% of the average diameter of the proppant particle substrate are contemplated.

Another way this enhanced buoyancy can be quantified is by determining the settled bed height of the self-suspending proppant after its non-extruder-derived gelatinized neutral starch coating has expanded through contact with an excess of water with the settled bed height of an equivalent amount of uncoated proppant substrate particles. Desirably, the amount of non-extruder-derived gelatinized neutral starch used will be sufficient so that the settled bed height, as determined in the manner discussed more fully below, is at least 50%, more desirably at least 125%, at least 150%, at least 200%, at least 250%, at least 300%, at least 350% and even at least 400% of the settled bed height of an equivalent amount of uncoated proppant substrate particles Still another way this enhanced buoyancy can be quantified is by comparing the density of the inventive self-suspending proppant when fully hydrated to the density of the proppant substrate particle from which it is made. For example, normal frac sand has a density of ~2.65 g/cc, whereas a self-suspending proppant made from this substrate particle can have a density of 1.5 g/cc when fully hydrated, for example. This means that the hydrogel coating has been able to decrease the effective density of this self-suspending proppant by 1.15 g/cc. In embodiments of this invention, the amount of gelatinized neutral starch used will be sufficient so that a decrease in density of at least about 0.25 g/cc, determined as described above, is achieved. More typically, the decrease in density will be at least about 0.50 g/cc, at least about 0.75 g/cc, at least about 1.00 g/cc, at least about 1.25 g/cc, or even at least about 1.50 g/cc.

Based on the above considerations, the amount of gelatinized neutral starch used to make the inventive self-suspending proppants when normal frac sand (density ~2.65 g/cc) is used as the proppant substrate particles will normally be about 0.5 to 50 wt. %, more typically 0.75 to 30 wt. %, 1 to 20 wt. %, more typically, about 2-15 wt. %, about 2.5-10 wt. %, or even about 3-8 wt. %, on a proppant substrate particles weight basis. When other proppant substrate particles are used, comparable amounts of neutral starch can be used. So, for example, if an intermediate density ceramic having a density of about 1.9 g/cc is used, the amount of neutral starch used on a dry weight basis can be about 0.72 (1.9/2.65) times the above amounts on a dry weight basis if the same relative increase in buoyancy is desired. If a greater amount of buoyancy is desired, more gelatinized neutral starch can be used, while if a less amount of buoyancy is desired, less neutral starch can be used, all of which can be easily determined by routine experimentation.

Finally, the maximum amount of non-extruder-derived gelatinized neutral starch that can be used to make the inventive self-suspending proppants will normally be limited by practical considerations in the sense that this amount is desirably not so much that no practical advantage is realized in terms of the increase in buoyancy provided by this material. This can be easily determined by routine experimentation.

Chemical Modification for Enhancing Coating Adhesion

In order to improve the durability of the non-extruder-derived gelatinized neutral starch coating of the self-suspending proppants of this invention once it has swollen, the non-extruder-derived gelatinized neutral starch forming the coating, the proppant substrate particle, or both can be chemically treated by one or more adhesion-promoting approaches.

In accordance with one such approach, the non-extruder-derived gelatinized neutral starch is crosslinked. For this purpose, any di- or polyfunctional crosslinking agent having two or more functional groups capable of reacting with the pendant hydroxyl, hydroxymethyl or other electronegative groups of the gelatinized neutral starch can be used. For example, organic compounds containing and/or capable of generating at least two of the following functional groups can be used: epoxy, carboxy, aldehyde, isocyanate, amide, vinyl, and allyl. Polyfunctional inorganic compounds such as borates, zirconates, silicas, silicates and their derivatives can also be used as well as guar and its derivatives.

Specific examples of polyfunctional crosslinking agents that can be used in this invention include epichlorohydrin, polycarboxylic acids, carboxylic acid anhydrides such as maleic anhydride, carbodiamide, formaldehyde, glyoxal, glutaraldehyde, various diglycidyl ethers such as polypropylene glycol diglycidyl ether and ethylene glycol diglycidyl ether, other di- or polyfunctional epoxy compounds, phosphorous oxychloride, sodium trimetaphosphate and various di- or polyfunctional isocyanates such as toluene diisocyanate, methylene diphenyl diisocyanate, 1-ethyl-3-(3-dimethylaminopropyl) carbodiamide, methylene bis acrylamide, naphthalenediisocyanate, xylene-diisocyanate, tetramethylene diisocyanate, hexamethylene diisocyanate, trimethylene diisocyanate, trimethyl hexamethylene diisocyanate, cyclohexyl-1,2-diisocyanate, cyclohexylene-1,4-diisocyanate, and diphenylmethanediisocyanates such as 2,4'-diphenylmethanediisocyanate, 4,4'-diphenylmethanediisocyanate and mixtures thereof.

The amount of such crosslinking agents that can be used can vary widely, and essentially any amount can be used. Normally, however, the amount used will be about 0.01 to 5.0 wt. %, more typically about 0.02 to 4.0 wt. %, about 0.03 to 3.0 wt. %, about 0.05 to 2.0 wt. %, about 0.075 to 1.0 wt. %, or even about 0.1-0.5 wt. %, based on the dry weight of the gelatinized neutral starch that is being used.

If a crosslinking agent is used, it can be added to the other ingredients at any time during preparation of the inventive self-suspending proppant. For example, it can be added as an additional ingredient to the mixture of gelatinized neutral starch and proppant substrate particles, before, after or simultaneously with gelatinization. In addition, it can also be added to the proppant particle substrate particles, or the gelatinized neutral starch or both, before they are combined with one another. In addition, it can also be added to the starch coated proppant particles after they have formed during the final drying and comminution step, thereby forming an outer crosslinked layer on the hydrogel polymer coating.

When a crosslinking agent is used, a catalyst for the crosslinking agent can also be included, if desired. Examples of suitable catalysts include acids, bases, amines and their derivatives, imidazoles, amides, anhydrides, and the like. These catalysts can be added together with the crosslinking agent or separately. If added separately, they can be added at any time during the preparation of the inventive self-suspending proppant, in the same way as the catalyst, as described above.

Another adhesion-promoting approach that can be used is pretreating the proppant substrate particles with a suitable adhesion promoter. For example, the proppant substrate particles can be pretreated with a silane coupling agent before it is combined with the gelatinized neutral starch. The chemistry of silane coupling agents is highly developed, and those skilled in the art should have no difficulty in choosing particular silane coupling agents for use in particular embodiments of this invention.

If desired, the silane coupling agent can be a reactive silane coupling agent. As well understood in the art, reactive silane coupling agents contain a functional group capable of reacting with functional groups on the polymers to be coupled. In this invention, therefore, the particular reactive silane coupling agents used desirably contain functional groups capable of reacting with the pendant hydroxyl, hydroxy methyl or other electronegative groups of the gelatinized neutral starch. Examples of such reactive silane coupling agents include vinyl silanes such as vinyl trimethoxy silanes, vinyl ethoxy silanes and other vinyl alkoxy silanes in which the alkyl group independently have from 1 to 6 carbon atoms. Other examples include reactive silane coupling agents which are based on one or more of the following reactive groups: epoxy, glycidyl/epoxy, allyl, and alkenyl.

Another type of adhesion promoter that can be used include agents which provide a wetting/binding effect on the bond between the proppant substrate particle and the non-extruder-derived gelatinized neutral starch coating. Examples include reactive diluents, wax, water, surfactants, polyols such as glycerol, ethylene glycol and propylene glycol, various tackifiers such as waxes, glues, polyvinyl acetate, ethylene vinyl acetate, ethylene methacrylate, low density polyethylenes, maleic anhydride grafted polyolefins, polyacrylamide and its blends/copolymerized derivatives, and naturally occurring materials such as sugar syrups, gelatin, and the like. Nonionic surfactants, especially ethoxylated nonionic surfactants such as octylphenol ethoxylate, are especially interesting.

Still another type of adhesion promoter that can be used is the starch crosslinking agents mentioned above. In other words, one way these crosslinking agents can be used is by pretreating the proppant substrate particles with them before these particles are mixed with the non-extruder-derived gelatinized neutral starch.

Drying

In accordance with this invention, the mixture of proppant substrate particles and non-extruder-derived gelatinized neutral starch as described above is dried to produce a mass of free-flowing self-suspending proppants. Drying can be done without application of heat, if desired. Normally, however, drying will be done by heating the mixture at temperatures as low as 40° C. and high as 300° C., for example. Normally, however, drying will be done at temperatures near or above the boiling point of water such as, for example, at >90° C. to 300° C., >90° C. to 200° C., 95° C. to 150° C., 100° C. to 140° C. or even 115° C. to 125° C. Also, in those embodiments in which the starch is heated for gelatinization in an earlier process step, as described above, drying will normally be done at drying temperatures which are higher than the gelatinization temperature by at least 20° C., more typically at least 40° C., at least 60° C., at least 80° C., or even at least 100° C.

In some embodiments of this invention in which a crosslinking agent for the non-extruder-derived gelatinized neutral starch is included in the system, the temperatures used for starch gelatinization in the mixing step described above may not be high enough to trigger the desired crosslinking reaction in any significant way. If so, the temperature at which drying of the coated proppants is carried out is preferably carried out at temperatures which are high enough to cause this crosslinking reaction to occur in a reasonable amount of time. So, for example, if an epoxy-based crosslinking agent such as polypropylene glycol diglycidyl ether is used, drying temperatures of 100° C., 110° C., 120° C. or more are preferably used as they will cause crosslinking to occur within 30 minutes or so, as shown in the following working examples.

In addition, in carrying out this drying step, although the mixture being dried can be left physically undisturbed until drying is completed, it is more convenient to subject it to occasional mixing during drying, as this helps keep the individual coated proppant particles from sticking to one another, thereby minimizing particle clumping and agglomeration.

One way that drying can be done is by placing the mixture in a conventional oven maintained at a desired elevated temperature. Under these conditions, drying will normally be complete in about 30 minutes to 24 hours, more typically about 45 minutes to 8 hours or even 1 to 4 hours. Moreover, by occasionally mixing the mass during this drying procedure, for example, once every 10 to 30 minutes or so, clumping/agglomeration of the coated proppant will be largely avoided, resulting in a free-flowing mass of proppants being produced.

Another convenient way of drying the mixture in accordance with this invention is by using a fluidized bed drier in which the mixture is fluidized by an upwardly flowing column of heated air. Fluidization causes individual coated proppant particles to separate from one another, which not only avoids clumping/agglomeration but also promotes rapid drying. Drying times as short as 20 minutes, 15 minutes, 10 minutes or even 5 minutes or less are possible when fluidized bed driers are used.

As a result of the manufacturing procedure described above, a mass of individual, discrete starch-coated self-suspending proppants can be produced. Although some clumping and agglomeration might occur, these clumps and agglomerates can normally be broken up by mild agitation. In addition, even if clumping and agglomeration becomes more serious, application of moderate pressure such as occurs with a mortar and pestle will usually be sufficient to break up any agglomerates that have formed.

Optional Overcoating

In accordance with yet another optional feature of this invention, the modified proppant described above comprising a proppant substrate particle carrying a first coating of a gelatinized non-extruder-derived neutral starch is overcoated with a second coating comprising a different neutral hydrogel polymer.

For this purpose, any hydrogel polymer which is different from the gelatinized non-extruder-derived neutral starch used to make the first coating can be used, including another gelatinized non-extruder-derived neutral starch. More commonly, however, the second coating will be made from a cationic hydrogel polymer, an anionic hydrogel polymer, a mixture of a cationic hydrogel polymer and an anionic hydrogel polymer, a mixture of a cationic hydrogel polymer and a neutral hydrogel polymer, a mixture of an anionic hydrogel polymer and a neutral hydrogel polymer or even a neutral hydrogel polymer which is extruder-derived. For example, the second coating can be made from a neutral polysaccharide other than neutral starches, another neutral naturally-occurring (non-polysaccharide) polymers such as gelatin and other collagen derived naturally occurring proteins and neutral synthetic polymers, or a cationic hydrogel polymer or a mixture of a cationic hydrogel polymer and an anionic hydrogel polymer. These hydrogel polymers can be naturally-occurring or synthetic. Specific examples include polyacrylamides, hydrolyzed polyacrylamides, polyvinyl alcohol (PVAs), polyolefin oxides such as PEO and PPO, guar gum, alginate, carrageenan, locust bean gum, carboxymethyl guar (CMG), carboxymethyl hydroxypropyl guar gum (CMPG), hydrophobically associating swellable emulsion (HASE) polymers, and the like. Polyacrylamides are preferred.

In accordance with this feature of the invention, it has been found that the swelling properties of the modified proppants made in this way, especially in waters containing high concentrations of calcium and other cations, can be improved by including an overcoating of this type in the proppant. In particular, it has been found that proppants made in this way exhibit enhanced (slower) settling rates in these waters, which result finds particular importance in the case of planned shutdowns or unexpected outages, since proppants exhibiting improved settling rates are much easier to re-suspend in aqueous treatment fluids once operations resume.

The second coating of this embodiment can be formed in any way that will achieve an overcoating with a different chemical composition from the first coating. For example, as illustrated in the following Example 4, the second coating can be applied after the first coating has been dried.

Alternatively and preferably, the second coating is applied to the non-extruder-derived neutral starch forming the first coating after this first coating substantially forms but before drying begins. In this context, "after this first coating substantially forms" will be understood to mean that, although the non-extruder-derived neutral starch forming this first coating may still be soft and pliable, nonetheless it still adheres to and forms an essentially continuous coating around the proppant substrate particle such that it blocks the vast majority (≥80%, ≥90%, ≥95% or even 100%) of the surface area of this particle from contact with the subsequently-applied hydrogel polymer forming the second coating.

Normally, adding the hydrogel polymer forming the second coating will not begin until all of the non-extruder-derived neutral starch forming the first coating has been added. If desired, however, adding the hydrogel polymer forming the second coating can begin before adding the non-extruder-derived neutral starch forming the first coating has been completed.

The above approach of adding the second coating after the first coating substantially forms but before drying begins finds particular application in the large-scale manufacture of the modified proppants of this embodiment of the invention. For example, producing a modified proppant in which the second coating is formed from a neutral polyacrylamide can conveniently be done by a continuous, in-line process in which the proppant substrate particle is continuously moved along a travel path, with an aqueous emulsion of the neutral polyacrylamide forming the second coating being added downstream of the place where the non-extruder-derived neutral starch forming the first coating is added but upstream of the place where drying begins.

The relative amounts of the first and second coatings can vary widely and basically any amounts can be used. In general, however, the amounts of these coatings used will be such that the amount of the second coating represents about 5-40 wt. % of the combined weights of the first and second coatings together. More typically, the amount of second coating used will be about represents about 10-25 wt. %, 12-22 wt. %, or even 15-20 wt. %, on this basis.

In this regard, it has been found that yet another advantage of the approach of this embodiment of the invention in which a second coating of a different hydrogel polymer is used is that the total amount of hydrogel polymer needed to achieve a certain level of performance, particularly in terms of improved settling rate, can be reduced substantially. For example, it has been found in accordance with this invention that by following this approach, modified proppants exhibiting settling times of 20 seconds or more when measured by the Settling Time Analytical Test described below can be achieved even though the total amount of hydrogel polymer used is ≤10 wt. % BOS, more typically, ≤9.5 wt. % BOS, ≤9 wt. % BOS, ≤8.5 wt. %, ≤8 wt. % BOS, ≤7.5 wt. % BOS, ≤7 wt. % BOS, ≤6.5 wt. % BOS, ≤6 wt. % BOS, ≤5.5 wt. % BOS, or even ≤5 wt. % BOS. Settling times of as much as 30 seconds or more, 40 seconds or more or even 50 seconds or more have been achieved.

"BOS" in this context means "based on the weight of sand," with the expression "≤10 wt. % BOS" being understood to mean that, if the proppant substrate particle used to make the proppant being referred to is sand, then the amount of hydrogel polymer used to make this proppant is ≤10 wt. % of the weight of the sand used to make this proppant. On the other hand, if the proppant substrate particle used to make the proppant is something other than sand, then the value of "≤10 wt. %" needs to be adjusted to account for the difference between the density of sand and the density of the proppant substrate particle actually used. For example, if the density of the proppant substrate particle actually used is 1.5 g/cc, then the value of "≤10 wt. %" needs to be multiplied by the ratio of the density of sand to the density of this proppant substrate particle [2.65 g/cc÷1.5 g/cc] or 1.77 to achieve the appropriate value for this proppant, ≤10 wt. %×1.77=≤17.7 wt. %.

The Settling Time Analytical Test used for this purpose is carried out in the following manner: 35 g of the proppant is mixed with 85 ml of the aqueous liquid to be tested in a glass bottle. The bottle is vigorously shaken for 1 minute, after which the entire contents of the bottle (proppant and liquid) are manually poured into a 100 mL graduated cylinder. The Settling Time is taken as the time that elapses, starting when the contents of the bottle are poured into the 100 mL graduated cylinder and ending when the last proppant particle reaches the settled mass at the bottom of this cylinder.

Properties

The self-suspending proppants of this invention, optionally but preferably, are free-flowing when dry. This means that any clumping or agglomeration that might occur when these proppants are stored for more than a few days can be broken up by moderate agitation. This property is beneficial in connection with storage and shipment of these proppants above ground, before they are combined with their aqueous fracturing fluids.

When deposited in their aqueous fracturing fluid, self-suspending proppants of this invention hydrate to achieve an effective volumetric expansion which makes them more buoyant and hence effectively self-suspending. In addition, they retain a significant portion of this enhanced buoyancy even if they are exposed to hard or salty water. Moreover, in embodiments, they are also durable in the sense that they retain a substantial degree of their self-suspending character (i.e., their enhanced buoyancy) even after being exposed to substantial shear forces.

This enhanced buoyancy can be quantitatively determined by a Settled Bed Height Analytical Test carried out in the following manner: 35 g of the proppant is mixed with 84 ml of the aqueous liquid to be tested in a glass bottle. The bottle is shaken for 1 minute, after which the bottle is left to sit undisturbed for 5 minutes to allow the contents to settle. The height of the bed formed by the hydrated, expanded proppant is then measured using a digital caliper. This bed height is then divided by the height of the bed formed by the uncoated proppant substrate particle. The number obtained indicates the factor (multiple) of the volumetric expansion.

The self-suspending proppants of this invention desirably exhibit a volumetric expansion, as determined by the above Settled Bed Height Test, of $\geq\sim0.5$, more desirably $\geq\sim0.8$, $\geq\sim0.9$, $\geq\sim10\geq\sim1.3$, $\geq\sim1.5$, $\geq\sim1.6$, $\geq\sim1.75$, $\geq\sim2$, $\geq\sim2.25$, $\geq\sim2.5$, $\geq\sim2.75$, $\geq\sim3$, or even $\geq\sim3.5$ after being subjected to the above first shaking regimen for 1 minute and settling for 5 minutes using ordinary tap water as the test liquid. Self-suspending proppants of this invention which exhibit volumetric expansions of $\geq\sim0.5$, $\geq\sim1.0$, $\sim1.3$, $\geq\sim1.5$, $\geq\sim1.75$, $\geq\sim2$, $\geq\sim2.25$, $\geq\sim2.5$, $\geq\sim2.75$ or even $\geq\sim3$ after having been subjected to the above second shaking regimen for 1 minute and settling for 5 minutes using the simulated test waters described in Table 2 below, are especially interesting, since these test waters have been formulated with varying amounts of $CaCl_2$), $MgCl_2$, $NaCl$ and $KCl$ to mimic the different types of aqueous liquids normally found in hydraulic fracturing. For example, Test water 1 was formulated to simulate sea water. Desirably, the inventive self-suspending proppants exhibit a volumetric expansion, as determined by this Settled Bed Height Analytical test when carried out using a simulated hard water containing 80,000 ppm $CaCO_3$, of $\geq\sim0.5$, $\geq\sim1.0$, $\geq\sim1.3$, $\geq\sim1.5$, $\geq\sim1.75$, $\geq\sim2$, $\geq\sim2.25$, $\geq\sim2.5$, $\geq\sim2.75$, $\geq\sim3$, or even $\geq\sim3.5$.

In this regard, it will be appreciated that a volumetric expansion of 2 as determined by this test roughly corresponds to cutting the effective density of the proppant in half. For example, if an inventive self-suspending proppant made from conventional frac sand exhibits a volumetric expansion of 2 according to this test, the effective density of this frac sand will have been reduced from ~2.65 g/cc to ~1.4 g/cc. Persons skilled in the art will immediately recognize that this significant decrease in density will have a major positive effect on the buoyancy of the proppant obtained which, in turn, helps proppant transport in hydraulic fracturing applications tremendously, avoiding any significant proppant settlement during this time.

In terms of maximum volumetric expansion, persons skilled in the art will also recognize that there is a practical maximum to the volumetric expansion the inventive proppants can achieve, which will be determined by the particular type and amount of hydrogel-forming polymer used in each application.

Another feature of the inventive proppants is that their non-extruder-derived gelatinized neutral starch coatings rapidly swell when contacted with water. In this context, "rapid swelling" will be understood to mean that at least 80% of the ultimate volume increase that these coatings will exhibit is achieved within a reasonable time after these proppants have been mixed with their aqueous fracturing liquids. Normally, this will occur within 8 to 12 minutes of the proppants being combined with their aqueous fracturing liquids, although it can also occur within 30 minutes, within 20 minutes, within 10 minutes, within 5 minutes, within 2 minutes or even within 1 minute of this time.

Still another feature of the inventive proppants is durability or shear stability. In this regard, it will be appreciated that proppants inherently experience significant shear stress when they are used, not only from pumps which charge the fracturing liquids containing these proppants downhole but also from overcoming the inherent resistance to flow encountered downhole due to friction, mechanical obstruction, sudden changes in direction, etc. The hydrogel coatings of the self-suspending proppants of this invention, although inherently fragile due to their hydrogel nature, nonetheless are durable enough to resist these mechanical stresses and hence remain largely intact (or at least associated with the substrate) until they reach their ultimate use locations downhole.

For the purposes of this invention, the enhanced buoyancy can be quantitatively determined by a Settled Bed Height Analytical Test carried out in the following manner: 35 g of the proppant is mixed with 85 ml of the aqueous liquid to be tested in a glass bottle. The bottle is vigorously shaken for 1 minute, after which bottle is left to sit undisturbed for 5 minutes to allow the contents to settle. The height of the bed formed by the hydrated, expanded proppant is then measured using a digital caliper. This bed height is then divided by the height of the bed formed by the uncoated proppant substrate particle. The number obtained indicates the factor (multiple) of the volumetric expansion. The self-suspending proppants of this invention desirably exhibit a volumetric expansion, as determined by the above Settled Bed Height Test, of $\geq\sim0.50$, more desirably $\geq\sim0.8$, $0.9$, $\geq\sim1.0$, $\geq\sim1.3$, $\geq\sim1.5$, $\geq\sim1.6$, $\geq\sim1.75$, $\geq\sim2$, $\geq\sim2.25$, $\geq\sim2.5$, $\geq\sim2.75$, $\geq\sim3$, or even $\geq\sim3.5$ after being subjected to the above first shaking regimen for 1 minute and settling for 5 minutes using ordinary tap water as the test liquid. Self-suspending proppants of this invention which exhibit volumetric expansions of $\geq\sim0.5$, $\geq\sim1.0$, $\geq\sim1.3$, $\geq\sim1.5$, $\geq\sim1.75$, $\geq\sim2$, $\geq\sim2.25$, $\geq\sim2.5$, $\geq\sim2.75$ or even $\geq\sim3$ after having been subjected to the above second shaking regimen for 1 minute and settling for 5 minutes using the simulated test waters described in Table 2 below, are especially interesting, since these test waters have been formulated with varying amounts of $CaCl_2$, $MgCl_2$, $NaCl$ and $KCl$ to mimic the different types of aqueous liquids normally found in hydraulic fracturing. For example, Test water 1 was formulated to simulate sea water.

In addition to the above Shear Analytical Test, another means for assessing coating durability is a Viscosity Measurement Test in which the viscosity of the supernatant liquid that is produced by the above Shear Analytical Test is measured after the proppant has had a chance to settle. If the durability of a particular proppant is insufficient, an excessive amount of its hydrogel polymer coating will come off and remain dissolved or dispersed in the supernatant liquid. The extent to which the viscosity of this liquid increases as a result of this dissolved or dispersed hydrogel polymer is a measure of the durability of the hydrogel coating. A viscosity of about 20 cPs or more indicates a low coating durability. Desirably, the viscosity of the supernatant liquid will be about 10 cPs or less, more desirably about 5 cPs or less.

Fracturing Process

As indicated above, the self-suspending proppants of this invention have been formulated to be especially resistant to the adverse effects calcium and other cations can have on the swelling properties of these proppants.

In this regard, it is well known that calcium and other cations can substantially retard the ability of anionic hydrogel-forming polymers to swell. This problem can be particularly troublesome when self-suspending proppants made with such polymers are used, because the waters to which the proppants are exposed, including both the source water from which the associated fracturing fluid is made up as well as the geological formation water which the proppants encounter downhole, can often contain significant quantities of these ions. This problem, i.e., the tendency of calcium and other cations to retard the ability of anionic hydrogel-forming polymers to swell, can begin to occur when the hardness of the water encountered by the polymer reaches levels as low as 300 ppm. In this context, the "hardness" of a water sample means the sum of the concentrations of all divalent cations in the sample in terms of an equivalent weight of calcium carbonate. For example, a hardness of 1,000 ppm means that the total concentration of divalent cations in the sample is the same as the concentration of calcium cations that would be produced by 1,000 ppm by weight of $CaCO_3$ dissolved in pure water.

In many places in the United States especially where hydraulic fracturing may be practiced, municipal waters (i.e., the potable water produced by local municipalities) can have hardness levels of 300 ppm or more, while naturally-occurring ground waters can have hardness levels of 1,000 ppm or more. Meanwhile, sea water has a hardness of approximately 6,400 ppm, while the geological formation waters encountered downhole in many locations where hydraulic fracturing occurs can have hardness levels even as high as 20,000 ppm, 40,000 ppm or even 80,000 ppm.

In accordance with this invention, the self-suspending proppants of this invention, because they are made from a non-extruder-derived neutral starch which is at least partially gelatinized, substantially retain their ability to swell during hydraulic fracturing, even when exposed to waters having these hardness levels, i.e., 300 ppm or more, 500 ppm or more, 1,000 ppm or more, 6,400 ppm or more, 20,000 ppm or more, 40,000 ppm or more or even 80,000 ppm or more.

In addition, these self-suspending proppants also substantially retain their ability to swell during hydraulic fracturing, even when exposed to waters containing levels of total dissolved solids (TDS) of 300 ppm or more, 1000 ppm or more, 30,000 ppm or more, 100,000 ppm or more, 200,000 ppm or more, and even 350,000 ppm or more.

WORKING EXAMPLES

In order to more thoroughly describe this invention, the following working examples are provided. In these examples, self-suspending proppants made in accordance with this invention were tested for their ability to swell when exposed to different simulated test waters. Test waters (Fresh Water, TW1 and TW2) were formulated with varying amounts of $CaCl_2$, $MgCl_2$, NaCl, $Na_2SO_4$ and KCl to mimic the different types of aqueous liquid normally found in hydraulic fracturing. Test water 1 was formulated to simulate sea water. The properties of these test waters are set forth in the following Table 2.

TABLE 2

Properties of Test Waters (TW)

| Property | Properties of Each Test Water | | |
|---|---|---|---|
| | Fresh Water | TW 1 | TW 2 |
| pH | 6.5 | 5.8 | 6.2 |
| Conductivity, μS | 295 | 19,200 | 501,000 |
| Hardness, ppm | 120 | 6,400 | 40,000 |
| TDS*, ppm | <1,000 | 29,600 | 350,000 |

*Total Dissolved Solids

Example 1. Proppants Made from Neutral Starch Made in a High Shear Mixer

Gelatinized neutral starch was made in the following manner: 149.9 g of Ingredion unmodified corn starch, which is a neutral, ungelatinized, food grade, powdered starch, was added to a mixing bowl together with corresponding amounts of NaOH solution and water. Then the mixing bowl was then attached to a Silverson L5M-A high shear mixer, and the contents mixed at 5,000 to 10,200 rpm for 7-10 min to produce gelatinized neutral starch.

Details are set forth in Table 3 below. In those runs indicated to occur at 25° C., sufficient heat was generated in situ by the high shear mixing such that additional heating was unnecessary. In those runs indicated to occur at 80° C., heat was supplied by immersing the mixing bowl in an oil bath.

This gelatinized starch made in this way was then used to make self-suspending proppants of this invention in the following way: 1000 g of sand was preheated at 350° F. and added into the mixing bowl of a commercial KitchenAid Professional 600 Series Bowl-lift Stand Mixer. Then predetermined amounts of starch paste from Example 1 were added to the mixing bowl, after which the mixture so formed was mixed at speed setting 5 for 0.5 min. Predetermined amounts of a 1.25 wt % PEGDGE (polyethylene glycol diglycidyl ether) solution in water was then added subsequently and mixed at speed setting 4 for 1~4 min, thereby causing starch coatings to be formed on the individual sand particles The starch-coated sand particles were then dried in a commercially-available laboratory-scale fluid bed dryer at 100° C. and 60 rpm for 1~8 min.

The results obtained are set forth in the following Table 3.

TABLE 3

Proppant Performance

| Sample | High Shear Mixing Temp/Time | Starch/Water Ratio | NaOH\Starch molar ratio | Coating Dry Loading (%, BOS)* | Crosslinker (%, Based on Starch) | Performance Testing 1st Shaking Swelling in TW1 | 2nd Shaking Swelling in TW1 | 1st Shaking Swelling in TW2 | 2nd Shaking Swelling in TW2 |
|---|---|---|---|---|---|---|---|---|---|
| 1-A | 80° C 10 min | 0.439 | 0.406 | 5.71 | 0.31 | 120% | 125% | 100% | 110% |
| 1-B | 80° C 10 min | 0.437 | 0.334 | 6.04 | 0.34 | 115% | 110% | 90% | 95% |
| 1-C | 80° C 10 min | 0.437 | 0.251 | 6 | 0.33 | 115% | 105% | 90% | 90% |
| 1-D | 25° C 7 min | 0.437 | 0.149 | 6.06 | 0.3 | 90% | 90% | 85% | 90% |
| 1-E | 25° C 7 min | 0.443 | 0.248 | 6.03 | 0.3 | 110% | 110% | 85% | 90% |
| 1-F | 25° C 7 min | 0.406 | 0.334 | 6.06 | 0.3 | 115% | 110% | 95% | 100% |
| 1-G | 25° C 7 min | 0.447 | 0.4 | 6.17 | 0.29 | 130% | 125% | 105% | 110% |
| 1-H | 25° C 7 min | 0.449 | 0.5 | 5.94 | 0.31 | 135% | 135% | 105% | 115% |

*BOS—Based on weight of sand

As can be seen from Table 3, additional heating did not appear to provide any significant benefit as compared to mixing without heat in this particular experiment, since high shear mixing process itself is an exothermal process. In addition, Table 3 also shows that the NaOH/starch molar ratio affects the final coated proppant's performance, with ratios above about 1.5 being preferable and ratios of 0.30 to 0.50 being even more preferable.

Viscosity values were not recorded in this experiment. However, the viscosities were qualitatively observed to be very thick, being in the nature of thick pastes which were in the ranges of free flowing to incapable of free flowing under the influence of gravity.

Example 2. Proppants Made from Gelatinized Neutral Starch Made in Overhead Mixer Example 1 was repeated except that the gelatinized starch used to coat the sand particles, thereby making the self-suspending proppants of this invention, was made using a commercial overhead mixer Heidolph RZR 2051 control mixer.

The results obtained are set forth in the following Table 4.

TABLE 4

Proppant Performance

| Sample | Overhead Mixing Temp/Time | Starch/Water Ratio | NaOH/Starch molar ratio | Coating Dry Loading (%, BOS) | Crosslinker (%, Based on Starch) | Performance Testing 1st Shaking Swelling in TW1 | 2nd Shaking Swelling in TW1 | 1st Shaking Swelling in TW2 | 2nd Shaking Swelling in TW2 |
|---|---|---|---|---|---|---|---|---|---|
| 2-A | 80° C. 5 min | 0.354 | 0.336 | 6.00 | 0.27 | 130% | 135% | 100% | 105% |
| 2-B | 80° C. 17 hr | 0.354 | 0.336 | 6.02 | 0.30 | 125% | 125% | 90% | 100% |

Table 4 shows that very long mixing times do not improve the final product's performance. In addition, it also shows that simple mixing in overhead mixing equipment without high shear mixing can provide essentially the same performance as high shear mixing. In this example, the viscosities of the gelatinized starch mixtures were observed to be slightly lower than the viscosities of the gelatinized starch mixtures of this example contained more water than those of the above Example 1, which is believed to be due to the fact that the gelatinized starch mixtures of this example contained slightly more water than those of Example 1.

Example 3. Starch Gelatinization and Sand Coating Occur Simultaneously

1 Kg of sand, after being placed into the mixing bowl of a Hobart Model HL120 commercial mixer or a commercial KitchenAid Professional 600 Series Bowl-lift Stand Mixer, was placed in an oven and pre-heated at 200° C. (392° F.) for 30 min. Separately, an aqueous dispersion containing 27-40 wt. % of Ingredion unmodified corn starch, which is a neutral, ungelatinized, food grade, powdered starch, and 60-73 wt. % water was formed. Predetermined amounts of this aqueous starch dispersion, and 16.8 wt. % aqueous solution of NaOH were then simultaneously added to the heated sand. The mixture so obtained was then mixed for 1-10 minutes, after which predetermined amounts of the 1.25 wt % polyethylene glycol diglycidyl ether (PEGDGE) aqueous solution were added. Mixing continued for an additional 1-4 min., thereby causing starch coatings to be formed on the individual sand particles The starch-coated sand particles were then dried in a commercially-available laboratory-scale fluid bed dryer at 100° C. and 60 rpm for 1~8 min.

The results obtained are set forth in the following Table 5.

TABLE 5

Proppant Performance

| | Coating | | | | Performance Testing | | | | | |
| | | | | | 1st | 2nd | | | | |
| Sample | Starch wt % in dispersion | Starch Loading (%, BOS) | NaOH/ Starch molar ratio | Crosslinker (%, Based on Starch) | Shaking Swelling in Fresh Water | Shaking Swelling in Fresh Water | 1st Shaking Swelling in TW1 | 2nd Shaking Swelling in TW1 | 1st Shaking Swelling in TW2 | 2nd Shaking Swelling in TW2 |
| --- | --- | --- | --- | --- | --- | --- | --- | --- | --- | --- |
| 3-A | 43.7 | 3.46 | 0.499 | 0.30 | — | — | 41% | 41% | 41% | 45% |
| 3-B | 27.4 | 3.46 | 0.499 | 0.30 | — | — | 77% | 77% | 86% | 86% |
| 3-C | 37.2 | 5.93 | 0.499 | 0.30 | — | — | 114% | 114% | 123% | 127% |
| 3-D | 31.5 | 3.5 | 0.335 | 0.30 | 100% | 95% | — | — | — | — |

KitchenAid mixer has lower shear rate then both Overhead mixer and Silverson high-shear mixer. The results show such lower shear rate still can make the gelatinization and coating complete simultaneously. The final coated proppants can also perform well. This process also helps to reduce large production cost due to its lower energy consumption than other two high shear mixers.

Example 4. Adding an Additional Hydrogel Polymer for Settling Rate Enhancement

Different amounts of a commercially-available non-ionic polyacrylamide hydrogel polymer were added to different pre-dried batches of the inventive salt-tolerant self-suspending proppant of run 3-B of the above Example 3. The compositions so obtained were then mixed at 150° F. for 1 minute in a commercial KitchenAid Professional 600 Series Bowl-lift Stand Mixer, thereby causing the non-ionic polyacrylamide to form coatings on the individual pre-dried proppants, after which the coated proppants so formed were dried in a commercially available fluid bed dryer at 100° F., at 60 rpm for 1-2 minutes. The results obtained are set forth in the following Table 6.

TABLE 6

Hydrogel Polymer Effect on Settling Rate

| Sample | PAM Hydrogel Polymer (%, BOS) | Settling Time in TW1 (1st Shake) (sec) | Settling Time in TW1 (2nd Shake) (sec) | Settling Time in TW2 (1st Shake) (sec) | Settling Time in TW2 (2nd Shake) (sec) |
| --- | --- | --- | --- | --- | --- |
| 4-A | 0.0 | 10.5 | 10.5 | 14.5 | 14.5 |
| 4-B | 0.5 | 20.0 | 23.0 | 30.0 | 32.0 |
| 4-C | 1.0 | 23.5 | 33.0 | 42.0 | 50.0 |

As shown in this table, adding a small amount of a non-ionic polyacrylamide hydrogel polymer more than doubled the settling time of the non-extruder-derived starch coated proppants of this invention. This shows that the settling rate of the non-extruder-derived starch coated proppants of this invention can be significantly improved (i.e., made slower) by including a different hydrogel polymer in their hydrogel coatings.

Although only a few embodiments of this invention have been described above, it should be appreciated that many modifications can be made without departing from the spirit and scope of this invention. All such modifications are intended to be included within the scope of this invention, which is to be limited only by the following claims.

The invention claimed is:

1. A process for fracturing a geological formation comprising pumping into the formation an aqueous fracturing fluid containing a self-suspending proppant comprising a proppant substrate particle and a coating of a hydrogel polymer on the proppant substrate particle, wherein the hydrogel polymer is a gelatinized non-extruder-derived neutral starch.

2. The process of claim 1, wherein during the fracturing process the self-suspending proppant is exposed to water having a hardness of at least 1,000 ppm.

3. The process of claim 2, wherein during the fracturing process the self-suspending proppant is exposed to water having a hardness of at least 20,000 ppm.

4. The process of claim 1, wherein the self-suspending proppant has been made by mixing proppant substrate particles with a non-extruder-derived neutral starch which is gelatinized thereby causing the non-extruder-derived neutral starch to form separate coatings on the individual proppant substrate particles, and then drying the starch-coated proppant substrate particles so formed.

5. The process of claim 1, wherein during manufacture of the self-suspending proppant
   (a) the proppant substrate particle is treated with an adhesion promoter,
   (b) the non-extruder-derived neutral starch is crosslinked, or
   (c) both.

6. The process of claim 1, wherein the self-suspending proppant exhibits a volumetric expansion of ≥~0.5 when exposed to
   (a) a simulated hard water containing 80,000 ppm $CaCO_3$,
   (b) a simulated hard water containing 350,000 ppm TDS (total dissolved solids), or
   (c) both.

7. The process of claim 1, wherein the total concentration of negative groups as well as the total concentration of positive groups in the non-extruder-derived neutral starch hydrogel polymer, as measured by the degree of substitution ("DS") of each, is less than 0.08.

8. The process of claim 1, wherein the self-suspending proppant has been made by coating proppant substrate particles with a non-extruder-derived neutral starch which has been gelatinized by subjecting a mixture of the non-extruder-derived neutral starch, water and an inorganic base to simple mixing, wherein the molar ratio of inorganic base to starch is 0.1 to 0.8.

9. The process of claim 1, wherein the coating of a hydrogel polymer on the proppant substrate particles includes at least one additional hydrogel polymer which is different from the gelatinized non-extruder-derived neutral starch, and further wherein at least 50 wt. % of a hydrogel-forming polymer in this coating are based on monosaccharide units having a neutral charge.

10. The process of claim 1, wherein the self-suspending proppant comprises a proppant substrate particle, a first coating of a gelatinized non-extruder-derived neutral starch on the proppant substrate particle and a second coating on the first coating comprising a hydrogel polymer which is different from the gelatinized non-extruder-derived neutral starch forming the first coating.

11. The process of claim 10, wherein the second coating is formed from a polyacrylamide.

* * * * *